United States Patent [19]

Goedken

[11] Patent Number: 4,707,127
[45] Date of Patent: Nov. 17, 1987

[54] AUTO-WIRELESS SHUTTER RELEASE CONTROL

[76] Inventor: Kenneth D. Goedken, 578 Hawkeye Ct., Iowa City, Iowa 52240

[21] Appl. No.: 827,381

[22] Filed: Feb. 7, 1986

[51] Int. Cl.⁴ .............................................. G03B 17/38
[52] U.S. Cl. .................................................... 354/266
[58] Field of Search ....................................... 354/266

[56] References Cited

U.S. PATENT DOCUMENTS 4,036,762  7/1977  Troetscher et al. ............ 354/266 X Primary Examiner—Michael L. Gellner

[57] ABSTRACT

The auto-wireless shutter release control is a mechanism that will allow the user to take a photograph by remote control. The system is comprised of an emitter that upon activating (push button) sends out a wave signal that is accepted via a receiver, which in turn activates a solenoid that pushes a cable plunger, releasing the camera shutter button, resulting in the photograph being taken.

3 Claims, 3 Drawing Figures

AUTO-WIRELESS SHUTTER RELEASE CONTROL

BACKGROUND AND SUMMARY OF THE INVENTION

This invention takes the current wireless remote-control technology and utilizes it to replace the current shutter release timer devices and manual cables used in the camera industry. The two current methods are used so that a person may take a photograph at a preset time (setting a timer) or to take a photo without shaking the camera (manual cable) which causes blurring. With both methods, many problems can arise, particularly in the preset timer method, due to the fact that there is a time element involved for the set up of the photo. There also is a safty principle, in that, elderly or disabled persons may not be able to use the present methods, due to the hurriedness of the preset time element, possibly resulting in injury. Therefore, if a product could be developed that would allow as much time as needed for the set up of the photo without such hurriedness or hassle, this would be most beneficial, and thus resulting in better quality, as well as, safer photography.

BRIEF DESCRIPTION OF DRAWINGS

Other objects and advantages of the invention will become more apparent from the specification taken in conjunction with the accompanying drawings, in which.

DETAILED DESCRIPTON OF THE INVENTION

Figure 1:
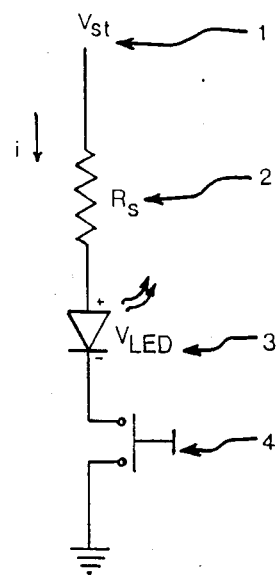
FIG. 1 is the electrical circuit that represents the emitter device which sends the signal.

Referring to the schematic diagram shown in FIG. 1, numeral 1 designates the emitter device circuitry, having a housing 21 as shown in sketch 1. The emitter circuit 1, is comprised of; a push button switch 5, a super high infrared emitter (diode) 4, a source resistor 3, and a +9 volt source supply 2.

Figure 2:
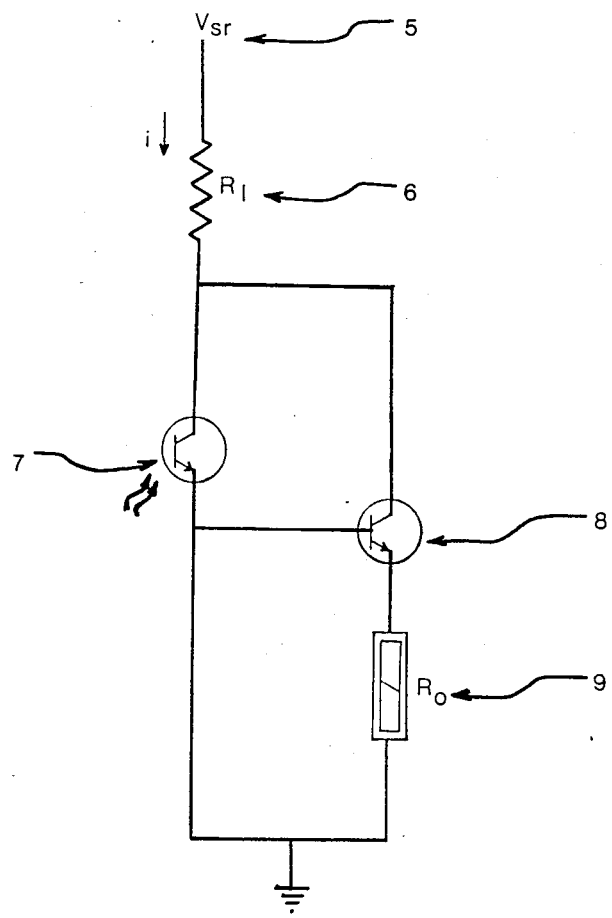
FIG. 2 is the electrical circuit that represents the receiver device which accepts the signal.

In the schematic diagram shown in FIG. 2, the receiver 6, having a housing 16, consists of; an infrared NPN phototransistor 10, a time delay capacitor (optional) 9, a load resistance (soleniod) 8, and the +9 volt supply 7. If the soleniod (load resistance) 8, is too large, replace the load resistance soleniod 8, with a resistor and add the alternate circuit 11 (refer to $R_L$ and $R_O$ in FIG. 2). The IR signal generated by the emitter 1, is picked up by the NPN phototransistor 10, the signal can time delay the soleniod 8 from extending the cable plunger 15 from striking the camera shutter release 13, by implementing a capacitor 9 as shown (optional).

Figure 3:
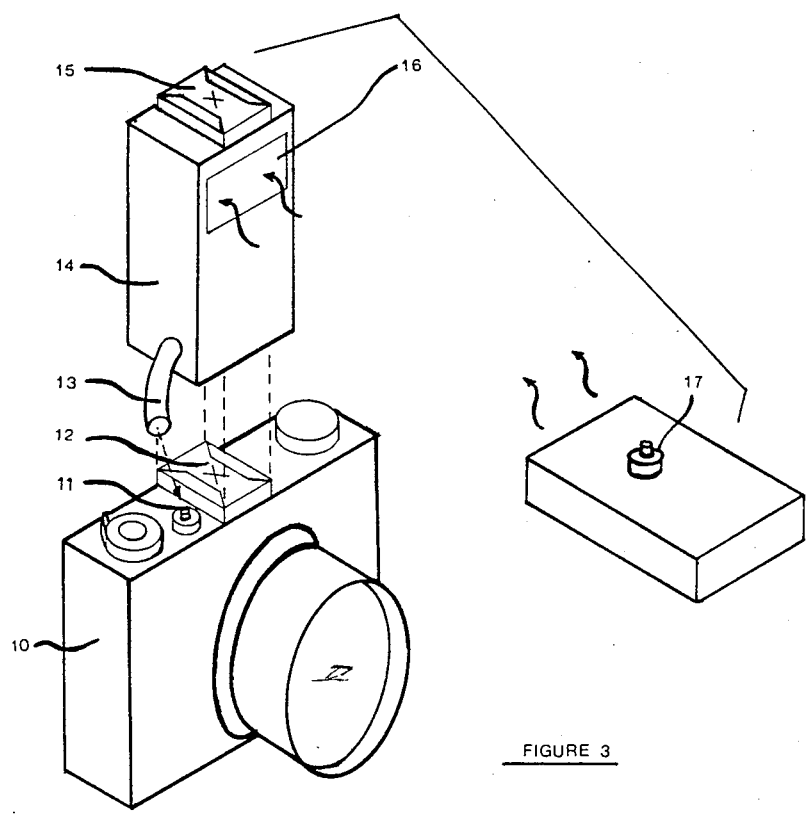
FIG. 3 illustrates a physical representation of the actual embodyment of the invention.

FIG. 3 illustrates the actual embodyment of the AUTO-WIRELESS SHUTTER RELEASE CONTROL (emitter 20 and receiver 16), as would be attached to a camera 12. The receiver 16 is attached to the camera 12, by sliding the receiver 16 into the (flash) hot shoe 14. The cable plunger 15 is attached to the shutter release button 13. Upon pushing the button switch 5 on the emitter 20 with circuitry 1, an infrared emitter signal is generated. This IF signal is receiver through a signal sensitive window 18, which then travels through the circuitry 6, as stated in the above paragraph, eventually tripping the shutter release button 13. The front view (the configuration may change depending on manufacturing parameters) of the receiver 16 is shown in 21. So to be able to use this device for flashbulb photos a flash hot shoe is put on the very top of the receiver 16, thus allowing the flash option to be attached.

I claim:

1. An automatic wireless remote control device which employs a switching mechanism to control a camera or the like, comprising emitter means for emitting a signal, receiver means for receiving the emitted signal comprising a power source, a resistor connected to the power source a phototransistor connected to the resistor, and a series circuit consisting of a second transistor and a solenoid connected in parallel with said phototransistor, the base of said second transistor being connected to ground.

2. The automatic wireless remote control device according to claim 1 further including means for connecting said receiver means to a hot shoe of said camera.

3. The automatic wireless remote control device according to claim 1 wherein said emitter means comprises a power source, a current limiting diode and a switch all connected in series.

* * * * *